(12) United States Patent  
Ouellette et al.

(10) Patent No.: US 7,286,485 B1
(45) Date of Patent: Oct. 23, 2007

(54) QUEUE BASED MULTI-LEVEL AQM WITH DROP PRECEDENCE DIFFERENTIATION

(75) Inventors: Michel Ouellette, Plantagenet (CA); James Aweya, Kanata (CA); Abel Dasylva, Ottawa (CA); Delfin Montuno, Kanata (CA)

(73) Assignee: Nortel Networks Limited, St. Laurent, Ontario (CA)

( * ) Notice: Subject to any disclaimer, the term of this patent is extended or adjusted under 35 U.S.C. 154(b) by 981 days.

(21) Appl. No.: 10/680,654

(22) Filed: Oct. 7, 2003

Related U.S. Application Data

(63) Continuation-in-part of application No. 09/455,445, filed on Dec. 6, 1999, now Pat. No. 6,690,645, and a continuation-in-part of application No. 10/633,459, filed on Aug. 1, 2003.

(51) Int. Cl.
*H04J 1/16* (2006.01)
*H04J 3/16* (2006.01)
*H04L 1/00* (2006.01)
*H04L 12/26* (2006.01)
*H04L 12/54* (2006.01)

(52) U.S. Cl. .................. 370/252; 370/229; 370/235
(58) Field of Classification Search ............ None
See application file for complete search history.

(56) References Cited

U.S. PATENT DOCUMENTS 7,221,656 B1 *  5/2007  Aweya et al. ............. 370/252

OTHER PUBLICATIONS

Aweya, J. et al., "A Control Theoretic Approach to Active Queue Management," *Computer Networks*, vol. 36, Issue 2-3, Jul. 2001, pp. 203-235.
Braden, D. et al., "Recommendation on Queue Management and Congestion Avoidance in the Internet," *IETF RFC 2309*, Apr. 1998.
Chait, Y et al., "Fixed and Adaptive Model-Based Controllers for Active Queue Management," *Proc. American Control Conf.*, Arlington, VA, Jun. 25-27, 2001, pp. 2981-2986.
Cnodder, S.D. et al. "A Rate Based Red Mechanism," *Proc. NOSSDAV 2000*, Chapel Hill, North Carolina, Jun. 26-28, 2000, pp. 602-609.
Feng, W. et al., "A Self-Configuring RED," *Proc. IEEE INFOCOM'99*, 1999, pp. 1320-1328.
Feng, W., et al., "BLUE: A New Class of Active Queue Management Algorithms", *Technical Report* CSE-TR-387-99, Dept. of EECS, University of Michigan, Apr. 1999.
Floyd, S., et al., "Random Early Detection Gateway for Congestion Avoidance," *IEEE/ACM Trans. Networking*, vol. 1, No. 4, Aug. 1993, pp. 397-413.

(Continued)

*Primary Examiner*—Ronald Abelson
(74) *Attorney, Agent, or Firm*—Ridout & Maybee LLP (57) ABSTRACT

Disclosed is a queue based multi-level Active Queue Management with drop precedence differentiation method and apparatus which uses queue size information for congestion control. The method provides for a lower complexity in parameter configuration and greater ease of configuration over a wide range of network conditions. A key advantage is a greater ability to maintain stabilized network queues, thereby minimizing the occurrences of queue overflows and underflows, and providing high system utilization.

13 Claims, 7 Drawing Sheets

OTHER PUBLICATIONS

Heinanen, J. et al., "Assured Forwarding PHB Group," *IETF RFC 2597*, Feb. 1999.

Hollot, C.V. et al., "A Control Theoretic Analysis of RED," *Proc. IEEE INFOCOM 2001*, 2001, pp. 1510-1519.

Hollot, C.V., et al., "On Designing Improved Controllers for AQM Routers Supporting TCP Flows," *Proc. IEEE INFOCOM 2001*, 2001, pp. 1726-1734.

Jacobson, V. et al., "An Expedited Forwarding PHB," IETF RFC 2598, Jun. 1999.

Kharitonov, V.L. et al., "Robust Stability of Time-delay Systems," *IEEE Trans. Automatic Control*, vol. 39, No. 12, Dec. 1994, pp. 2388-2397.

Kunniyur, S. et al., "End-to-end Congestion Control: Utility Functions, Random Losses and ECN Marks," *Proc. IEEE INFOCOM'2000*, Tel Aviv, Israel, Mar. 2000, pp. 1323-1332.

Misra, V. et al. "Fluid-based Analysis of a Network of AQM Routers Supporting TCP Flows with an Application to RED," *Proc. ACM SIGCOMM 2000*, 2000, pp. 151-160.

Morris, R. et al., "Scalable TCP Congestion Control," *Proc. IEEE INFOCOM 2000*, pp. 1176-1183.

Nichols, K. et al., "Definition of the Differentiated Services Field (DS Field) in the IPv4 and IPv6 Headers," *IETF RFC 2474*, Dec. 1998.

Ott, T.J. et al., "SRED: Stabilized RED", *Proc. IEEE INFOCOM'99*, NY, Mar. 21-25, 1999, pp. 1346-1355.

Silva, G.J. et al., "New Results on the Synthesis of PID Controllers," *IEEE Trans. Automatic Control*, vol. 47, No. 2, Feb. 2002, pp. 241-252.

Silva, G.J. et al., "Stabilization of Time Delay Systems," *Proc. American Control Conf.*, Chicago, Illinois, Jun. 2000, pp. 963-970.

Su, L. et al., "An Active Queue Management Scheme for Internet Congestion Control and its Application to Differentiated Services," *Proc. ICCCN 2000*, Las Vegas, Nevada, Oct. 2000, pp. 62-68.

Villamizar, C. et al., "High Performance TCP in ANSNET," *ACM Computer Commun. Rev.*, vol. 24, No. 5, Oct. 1995.

\* cited by examiner

QUEUE BASED MULTI-LEVEL AQM WITH DROP PRECEDENCE DIFFERENTIATION

RELATED U.S. APPLICATION DATA

This patent application is a continuation-in-part application of U.S. patent application Ser. No. 09/455,445 filed Dec. 6, 1999 now U.S. Pat. No. 6,690,645 and U.S. which is a continuation-in-part of patent application Ser. No. 10/633,459 filed Aug. 1, 2003; the contents of which are hereby incorporated by reference.

FIELD OF THE INVENTION

The present invention relates to network queue management and is particularly concerned with queue based multi-level active queue management with drop precedence differentiation.

BACKGROUND OF THE INVENTION

New applications and user requirements are driving the need for a network architecture that is both flexible and capable of differentiating between the needs of different applications and users. Different applications and users are increasingly demanding different quality of service (QoS) and network usage rates. The current Internet and most private corporate networks, however, offer best-effort service to traffic. To address these new demands, the Internet Engineering Task Force (IETF) has been looking at a number of architectural enhancements that will enable networks to provide service differentiation based on application and user needs. One of these efforts has resulted in the differentiated services (DiffServ) architecture.

In the DiffServ architecture, an edge device (gateway, router, switch, server, etc.) would classify/mark packets into several behaviour aggregates according to their diverse QoS requirements such as bandwidth, delay, and packet drop precedence. A DiffServ domain refers to a contiguous set of nodes operating with a common set of service provisioning policies and per-hop-behaviours (PHB) definitions. Per-domain services are realized by traffic conditioning at the edge and simple differentiated forwarding at the core of the network. Packets are marked with the appropriate DiffServ codepoint (DSCP) at the edge of the network and within the core of the network, the network nodes (routers, switches, etc.) simply forward packets based on the PHB associated with the DSCP. An end-to-end differentiated service is obtained by concatenation of per-DiffServ domain services. The underlying goal of the DiffServ architecture is to address the scalability issue regarding per-flow service differentiation in the core of the network. In DiffServ, the core network elements do not necessarily have to implement complex resource reservation, scheduling, processing and classification mechanisms in addition to maintaining state information for each individual traffic flow. The architecture allows network designers to push most of the state and forwarding complexity to the edge of the network.

The IETF decided to specify particular forwarding behaviours (the PHB) rather than standardizing services. This is to allow service providers the freedom to construct services that meet their customers' needs. The IETF has currently standardized two PHB groups, namely, Expedited Forwarding (EF) PHB and the Assured Forwarding (AF) PHB. Packets marked for the EF PHB receive a premium service with low loss, low latency, low jitter, and guaranteed bandwidth end-to-end. The AF PHB, on the other hand, specifies four independent classes of forwarding (each of which can be assigned a certain amount of forwarding resources, i.e., buffer space and bandwidth) and three levels of drop precedence per class. The three drop precedence levels are also referred in terms of color (in the order of high to low priority or precedence) as green, yellow, and red. During network congestion, an AF-compliant DiffServ node drops low precedence (red) packets in preference to higher precedence (green, yellow) packets.

With the AF PHB, packets entering the network are marked with the goal of assigning a low drop probability to the traffic that fits within the subscribed profile and a higher drop probability to the excess traffic. During congestion at a node, packets marked with higher drop probability are preferentially dropped in order to make buffer room for packets marked with the lowest drop probability (which may be dropped only in the case of severe congestion). For these reasons, the packet drop mechanism at the node plays an important role in the quality of service offered to the user.

Active queue management (AQM) has been proposed as a means to provide some congestion control as well as some notion of QoS to users. One important class of AQM is based on randomized packet dropping or marking. With this form of AQM, a network node drops each arriving packet with a certain probability, where the exact probability is a function of the average queue size (or any suitable indicator of network congestion such as rate mismatch at a node). With AQM, dropping a packet is a way of signalling congestion to adaptive traffic sources such as those running transport protocols like the Transmission Control Protocol (TCP). By dropping a packet, the node sends an implicit indication to the traffic source that congestion is experienced at some point along the end-to-end path to the destination. The traffic source is expected to respond to this indication by reducing its transmission rate so that the network node buffer does not overflow. An important benefit of AQM is that it avoids the global synchronization of many traffic sources decreasing and increasing their window at the same time. The random early detection (RED) algorithm is a well known example of an AQM algorithm.

The difficulty in configuring or tuning the RED parameters has resulted in the need for development of alternatives to RED. In view of the foregoing, it would be desirable to provide a technique for network queue management which overcomes the above-described inadequacies and shortcomings by providing a mechanism which does not react to short-term burst traffic and allows each precedence level to be addressed differently, while providing lower parameter configuration complexity and greater ease of configuration over a wide range of network conditions.

SUMMARY OF THE INVENTION

An object of the present invention is to provide an improved queue based multi-level active queue management with drop precedence differentiation.

According to an aspect of the present invention, there is provided a method for controlling a data flow in a data network at an element having a queue, starting with the step of specifying a plurality of precedence grades, each of the precedence grades having an associated priority. Next, for each precedence grade, calculating a cumulative queue size $q(n)$ where $q(n)$ is the sum of the queue size for a particular precedence grade under consideration plus the queue sizes of all precedence grades with a higher priority than said particular precedence grade under consideration. Then, for each precedence grade calculating an error signal $e(n)$, according to the relation $e(n)=(q(n)-T)$, where T is an assigned precedence grade queue capacity at time n. Following this, there is computed for each precedence grade a mark/drop probability p(n) according to the relation:

$$p(n)=\min\{\max[p(n-1)+\alpha \cdot e(n)/2 \cdot T, 0], \theta\}$$

where α is a control gain, and $0<\theta\leq 1$; and subsequently, for each precedence grade executing a packet mark/drop routine based upon the calculated mark/drop probability p(n). A convenient number of precedence grades is three.

Conveniently, the queue size may be filtered by use of an exponentially weighted moving average scheme according to the relation:

$$q'(n)=(1-\beta)\cdot q'(n-1)+\beta \cdot q(n)$$

where β is a filter gain parameter such that $0<\beta<1$,
q'(n−1) is the filtered queue size at time n−1,
q'(n) is the desired filtered queue size at time n, and
q(n) is the cumulative queue size at time n.

According to another aspect of the invention, preceding the packet mark/drop routine may be a bypassing routine involving the steps of for each precedence grade testing the cumulative queue size q(n) against a queue threshold L specific to that precedence grade; and if the cumulative queue size q(n) is below or equal to the queue threshold L then bypassing the step of executing a packet mark/drop routine for that precedence grade.

Conveniently, the packet mark/drop routine may be realized according to a random number generator mark/drop scheme.

In accordance with another other aspect of the present invention, there is provided an apparatus for controlling a data flow in a data network having a plurality of precedence grades, where each of the precedence grades has a priority associated with it. The apparatus has a cumulative queue size calculator for calculating a cumulative queue size q(n) associated with each of the plurality of precedence grades, wherein q(n) is the sum of the queue sizes for a particular precedence grade under consideration plus the queue sizes of all precedence grades with a higher priority than said particular precedence grade under consideration. The apparatus further contains an error signal calculator for calculating an error signal e(n) for each of said plurality of precedence grades according to the relation:

$$e(n)=(q(n)-T),$$

where T is an assigned precedence grade queue capacity at time n. Further, the apparatus has a mark/drop probability processor for computing a mark/drop probability p(n) for each of said plurality of precedence grades according to the relation $$p(n)=\min\{\max[p(n-1)+\alpha \cdot e(n)/2 \cdot T, 0], \theta\}$$

where α is a control gain, and $0<\theta\leq 1$; and a packet mark/drop module for executing a packet mark/drop routine based upon the calculated mark/drop probability p(n).

In accordance with another other aspect of the present invention, there is provided an article of manufacture carrying instructions for a method for queue based multi-level active queue management with drop precedence differentiation in a data network and, further, there is provided a signal embodied in a carrier wave representing instructions for a method for queue based multi-level active queue management with drop precedence differentiation in a data network according to an integral control scheme.

The method and apparatus of the invention serve to integrate congestion control features into the differentiated service architecture. Advantages of the present invention include the lower parameter configuration complexity and the ease of configuration it offers over a wide range of network conditions. The invention has the further goal of maintaining stabilized network queues, thereby minimizing the occurrences of queue overflows and underflows, and providing high system utilization.

The present invention will now be described in more detail with reference to exemplary embodiments thereof as shown in the appended drawings. While the present invention is described below with reference to the preferred embodiments, it should be understood that the present invention is not limited thereto. Those of ordinary skill in the art having access to the teachings herein will recognize additional implementations, modifications, and embodiments which are within the scope of the present invention as disclosed and claimed herein.

BRIEF DESCRIPTION OF THE DRAWINGS

The invention will be further understood from the following detailed description of embodiments of the invention and accompanying drawings in which.

DETAILED DESCRIPTION

The description that follows describes a multi-level active queue management scheme with drop precedence differentiation which maintains stabilized network queues, thereby minimizing the occurrences of queue overflows and underflows, and concurrently providing high system utilization.

According to an embodiment of the invention there is a method that uses a simple feedback control approach to randomly, discard packets with a load-dependent probability when a buffer in a network device gets congested. The method maintains the average queue size close to a predetermined threshold, but allows transient traffic bursts to be queued without unnecessary packet drops. Following is a brief overview of the packet drop probability computations required for the method.

In this embodiment, congestion is controlled by randomly dropping packets in relation to a probability. This dropping of packets constitutes a signal to applications (TCP sources) to reduce their sending rate. The method takes a decision of dropping or accepting an incoming packet so that the queue occupancy level is kept at a given target level, thereby eliminating, as much as possible, buffer underflow and overflow.

The actual queue size in the network device is assumed to be sampled every Δt units of time (seconds), and the algorithm provides a new value of the drop probability $p_d$ every Δt units of time. The parameter Δt is the sampling/control interval of the system. The control system will be described in discrete time.

Let q(n) denote the actual queue size at discrete time n, where n=1Δt, 2Δt, 3Δt,K and T the target buffer occupancy. What is required is to determine a drop probability $p_d$ which will drive the filtered queue size to this target buffer occupancy. So it is necessary to adapt $p_d$ to react to the filtered queue dynamics experienced at the node using the following control method: if the filtered queue size q̂ is smaller than the target queue size T, $p_d$ is decreased to make more aggressive usage of the available resources, and vice versa if the filtered queue size is high.

The goal of the controller is therefore to adapt $p_d$ so that the magnitude of the error signal $$e(n) = \hat{q}(n) - T$$

is kept as small as possible.

The filtered queue size can be obtained, for example, using a simple exponentially weighted moving average (EWMA) filter, $$\hat{q}(n) = (1-\beta)\hat{q}(n-1) + \beta q(n), \ 0 < \beta < 1.$$

The control mechanism is then obtained as the incremental adaptation of the drop probability $p_d$ proportional to the error signal $$p_d(n) = p_d(n-1) + \alpha e(n),$$

where α is a control gain.

Note that $p_d(n)$, as a probability, is always bounded by $0 \leq p_d(n) \leq 1$, for all n.

Using a basic recursion of $$p_d(n) = p_d(n-1) + \alpha e(n)$$

implements the standard summation or integral control scheme since $$\Delta p_d(n) = p_d(n) - p_d(n-1) = \alpha e(n) \text{ or}$$

$$p_d(n) = \alpha \sum_{i=0}^{n} e(i),$$

in discrete-time (and $dp_d(t)/dt = \alpha e(t)$ or $p_d(t) = \alpha \int_0^t e(\tau) d\tau$, in continuous-time).

In the method implemented in this embodiment, the normalized error signal is used instead, resulting in the control equation $$p_d(n) = p_d(n-1) + \alpha \frac{e(n)}{2T},$$

where the term 2T serves only as a normalization parameter.

Filtering of the queue size q has the important benefit of allowing traffic bursts to be queued without being unnecessarily discarded. This is because congestion is detected by comparing the average queue size to a pre-determined threshold. In effect, only the average queue size is controlled, allowing transient traffic bursts to be accommodated in the queue.

Figure 1:
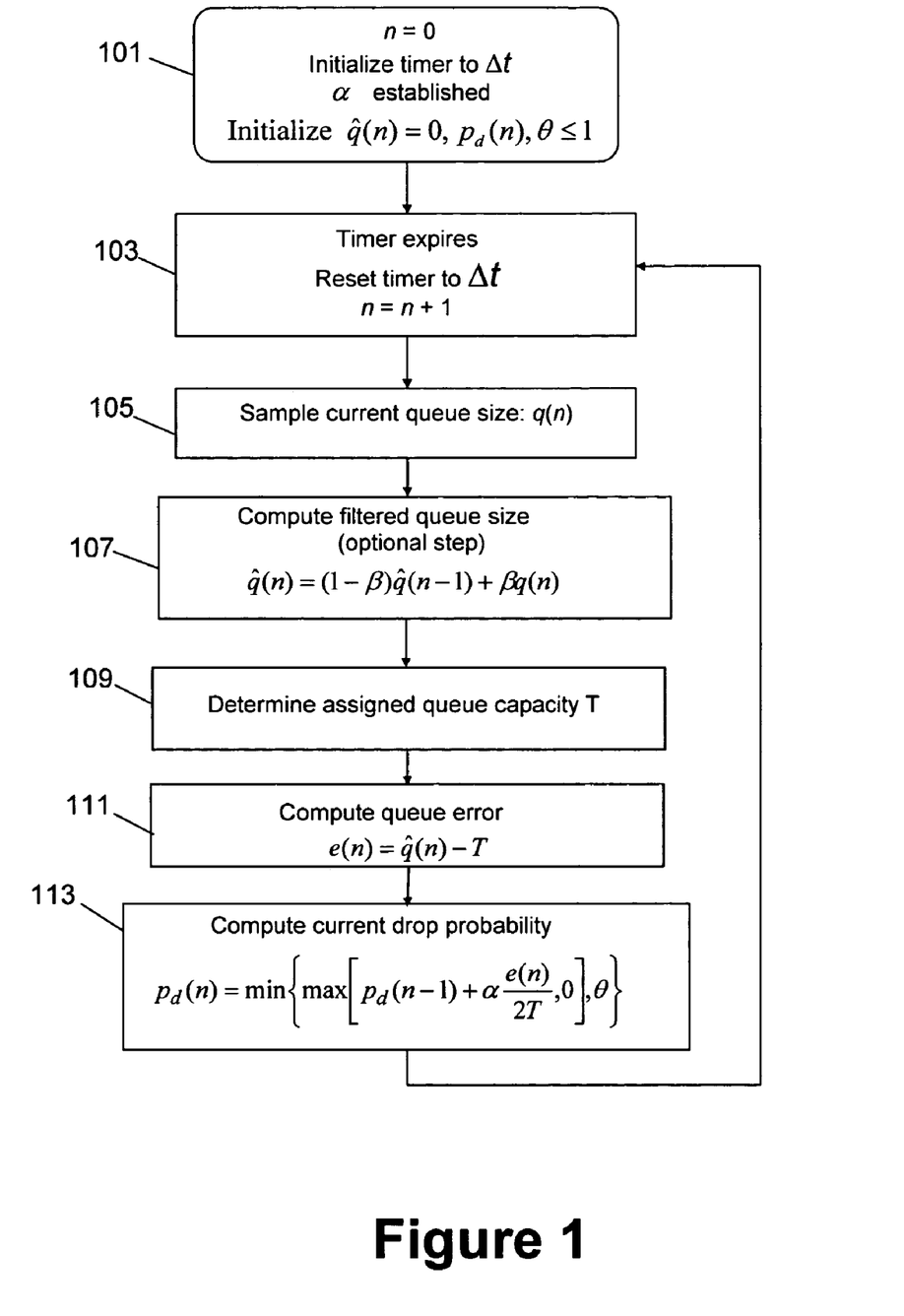
FIG. 1 is a block diagram of a mark/drop probability computation routine according to an embodiment of the invention.

FIG. 1 represents a flowchart of the drop probability computations. The parameter θ≤1, initialized at step 101 in FIG. 1 is an optional upper bound on the drop probability $p_d$. As shown in FIG. 1 the process initiates, at step 101, at discrete time n=0, by initializing certain parameters. A timer is set to Δt time units, a control gain α is established, and mark/drop probability $p_d$ (n), and initial queue size q̂(n) are set to initial values. The initial mark/drop probability is used in the mark/drop routine until further samples are available. At step 103, the timer is reset to Δt time units to advance to the next discrete time interval. Then at step 105, the current queue size q(n) is measured.

At step 107, there is an optional step of pre-filtering the queue size as described previously.

At step 109, the assigned queue capacity is determined. Typically, this is a given for a particular network configuration but may vary as circumstances warrant, for example, if the network is modified.

At step 111, an error signal e(n) is calculated as the difference between the assigned capacity and the measured (and possibly filtered) queue size.

At step 113, a current mark/drop probability $p_d(n)$ is calculated using the gain α established at step 101.

The mark/drop probability calculated at step 113 may be used as the mark/drop probability until the next measurement time as tracked by the timer, at which point a new mark/drop probability will be calculated. In addition, the filtered queue size q̂(n), if filtering is used, is stored to be used at the next measurement time.

The process may then loop back to step 103 upon timer expiration for another iteration of the process.

Figure 2:
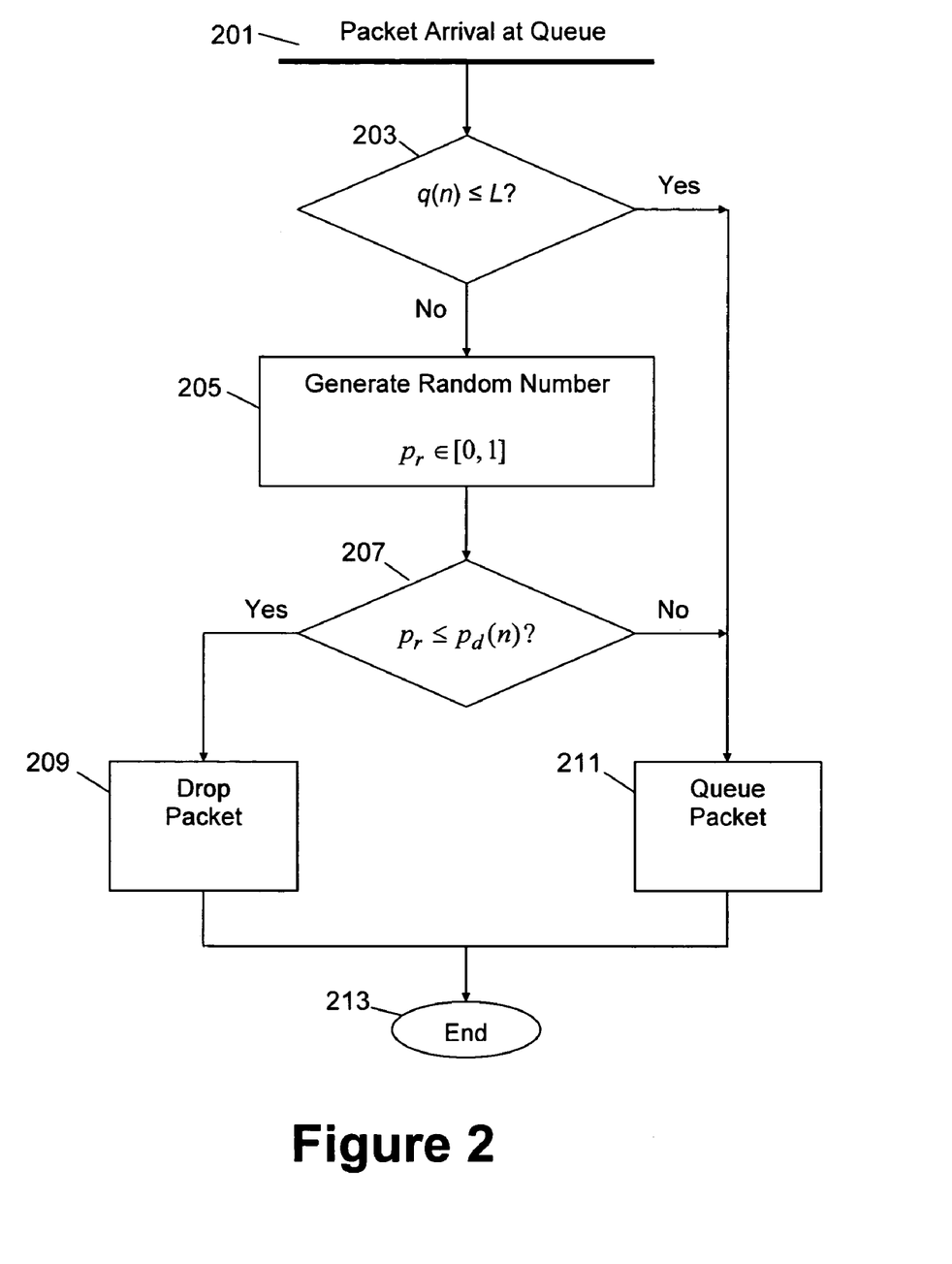
FIG. 2 is a block diagram of a packet drop/mark routine according to an embodiment of the invention.

Next is described a method for dropping packets at a queue. As shown in the flowchart in FIG. 2, the decision to accept or drop an incoming packet is based on the outcome of a comparison of a randomly generated number $p_r \in [0,1]$ and the drop probability $p_d$. The procedure can be summarized as follows:

if q(n)≤L, then accept incoming packet
else, if $p_r \in [0,1] \leq p_d$, then drop packet,
else, accept packet Conveniently, the parameter L (L≤T) may be introduced in the control process to help maintain high link utilization and keep the queue size around the target level. The drop controller does not drop packets when q(n)≤L in order to maintain high resource utilization and also not to further penalize sources which are in the process of backing off in response to (previous) packet drops. Note that there is always a time lag between the time a packet is dropped and the time a source responds to the packet drop. The computation of $p_d$, however, still continues even if packet dropping is suspended (when q(n)≤L). The parameter L is typically configured to be a little smaller than T, e.g., L can be in the range L∈[0.8T, 0.9T]. A recommended value is L=0.9T.

Referring to FIG. 2, upon a packet arrival at the queue, at step 201, a determination is made whether the queue size q(n) is less than or equal to a corresponding no-mark/drop queue threshold L. If the size is less than or equal to the threshold, then the incoming packet is queued at step 211.

If the size is not less than or equal the threshold, then the routine moves to step 205 where a random number $p_r \in [0,1]$ is generated.

At step 207 a determination of whether the random number $p_r$ is less than or equal to the calculated mark/drop probability $p_d(n)$ is made.

If the probability $p_r$ is less than or equal $p_d(n)$, then the packet is marked/dropped at step 209. If not, the packet is queued at step 211.

The process ceases at step 213 until triggered again by the arrival of another packet.

Following is a description of an enhanced algorithm which retains all the features of the basic algorithm in addition to the ability to drop low precedence packets in preference to higher precedence packets.

An enhanced embodiment consists of multiple instances of the basic method. Each instance is associated with a precedence grade. A precedence grade is a traffic type having an associated priority. An example precedence grading scheme is that of the green-yellow-red color schema. Each instance (one for each priority or color) will be controlling traffic in a single queue but with the instances having different thresholds. As an example of the enhanced algorithm applied to a case of three precedence grades the following parameters are defined:

(Note: although the discussion here is centered around three drop precedences, higher levels of drop precedence (other than three) can be used.)

Three queue size counters (used as congestion indicators), one for each color, $c \in \{g=\text{green}, y=\text{yellow}, r=\text{red}\}$, with green packets having higher precedence than red or yellow packets, and yellow packets having higher precedence than red packets:

$q_g$& sum of only green packets in the aggregate queue;

$q_y$& sum of yellow and green packets in the aggregate queue; and $q_r$& sum of all packets (of all colors) in the aggregate queue.

Long term averages of these queue sizes are maintained as $\hat{q}_g$, $\hat{q}_y$, and $\hat{q}$, respectively. Especially note that the sum for a particular color or precedence grade is not the specific sum of the packets having that color, but for the purposes here is the combined sum of the total of the packets of that color summed with the total of the packets of higher precedence grade. Thus, $\hat{q}_g$ being the queue size of the highest precedence grade, is solely the queue size of the green packets whereas $\hat{q}_y$ is the sum of the total of the yellow packets plus the total of the green packets, the green packets being of higher precedence grade than the yellow. The same relation holds for the case of other than three precedence grades.

Figure 3:
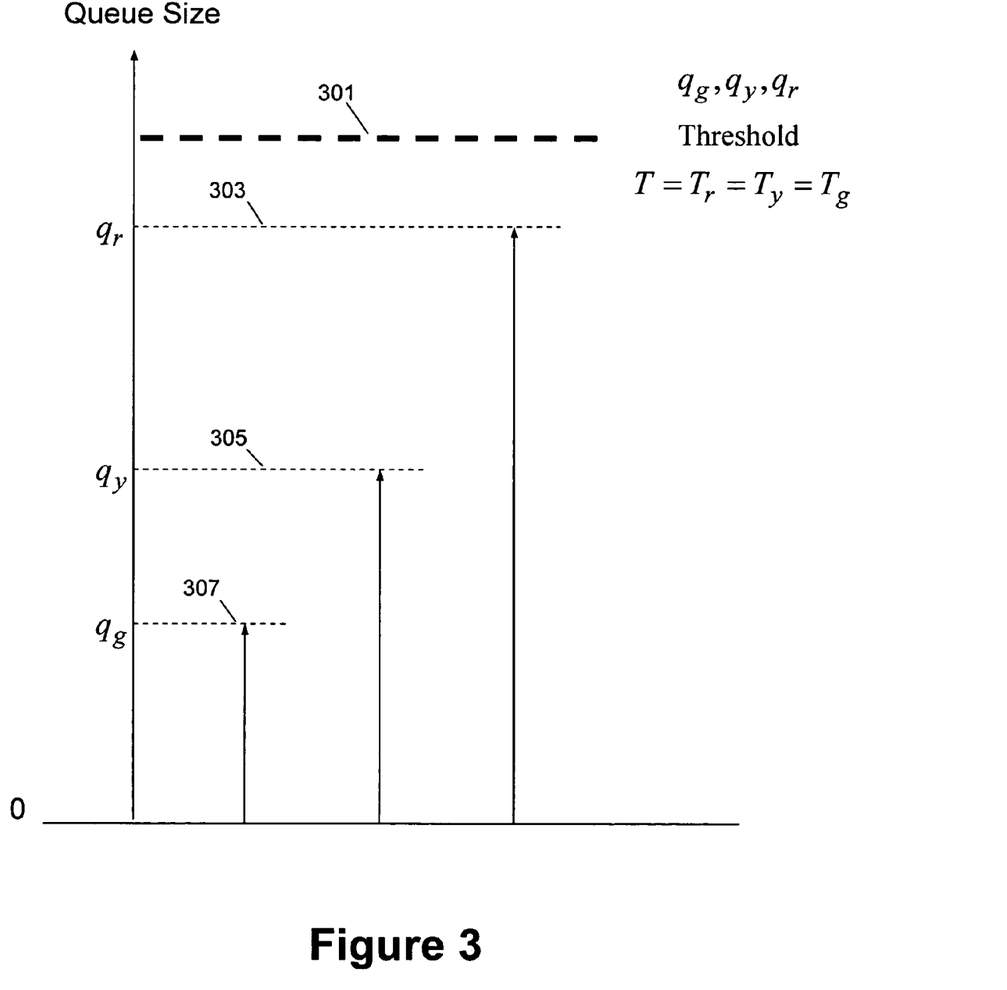
FIG. 3 is a plot of the relative relationship of three queue sizes relative to a threshold according to an embodiment of the invention.

One queue threshold for all colors, $T=T_c$ $c \cdot E$ $\{g,y,r\}$ as illustrated in FIG. 3.

Three no-drop thresholds, one for each colors, $L_c$, $c \in \{g,y,r\}$. Alternatively, one no-drop threshold could be used for all colors, $L=L_c$, $c \in \{g,y,r\}$.

Three drop probability computations, one for each color, $p_{d,c}$, $c \in \{g,y,r\}$ $$p_{d,c}(n) = p_{d,c}(n-1) + \alpha \frac{e_c(n)}{2T}, c \in \{g, y, r\}$$

Figure 4:
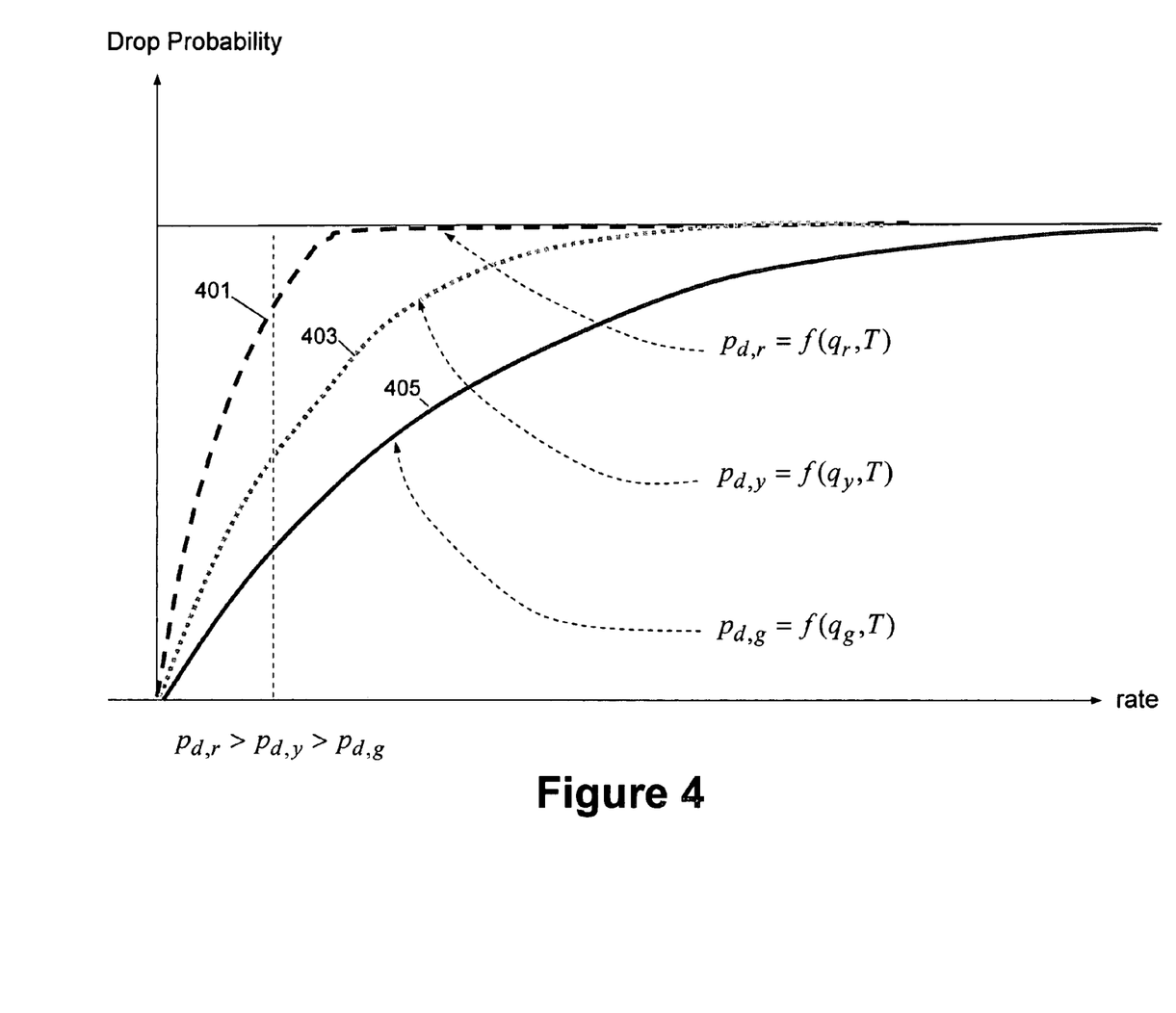
FIG. 4 is a plot of the relative relationship of three drop probabilities according to an embodiment of the invention.

Under sustained congestion (where traffic of all color are sent to the queue), the drop probabilities $p_{d,g}$ 405, $p_{d,y}$ 403 and $p_{d,r}$ 401 will increase relative to each other as shown in FIG. 4. At any given instant during the congestion, the drop probabilities will be $p_{d,g} < p_{d,y} < p_{d,r}$.

Figure 5:
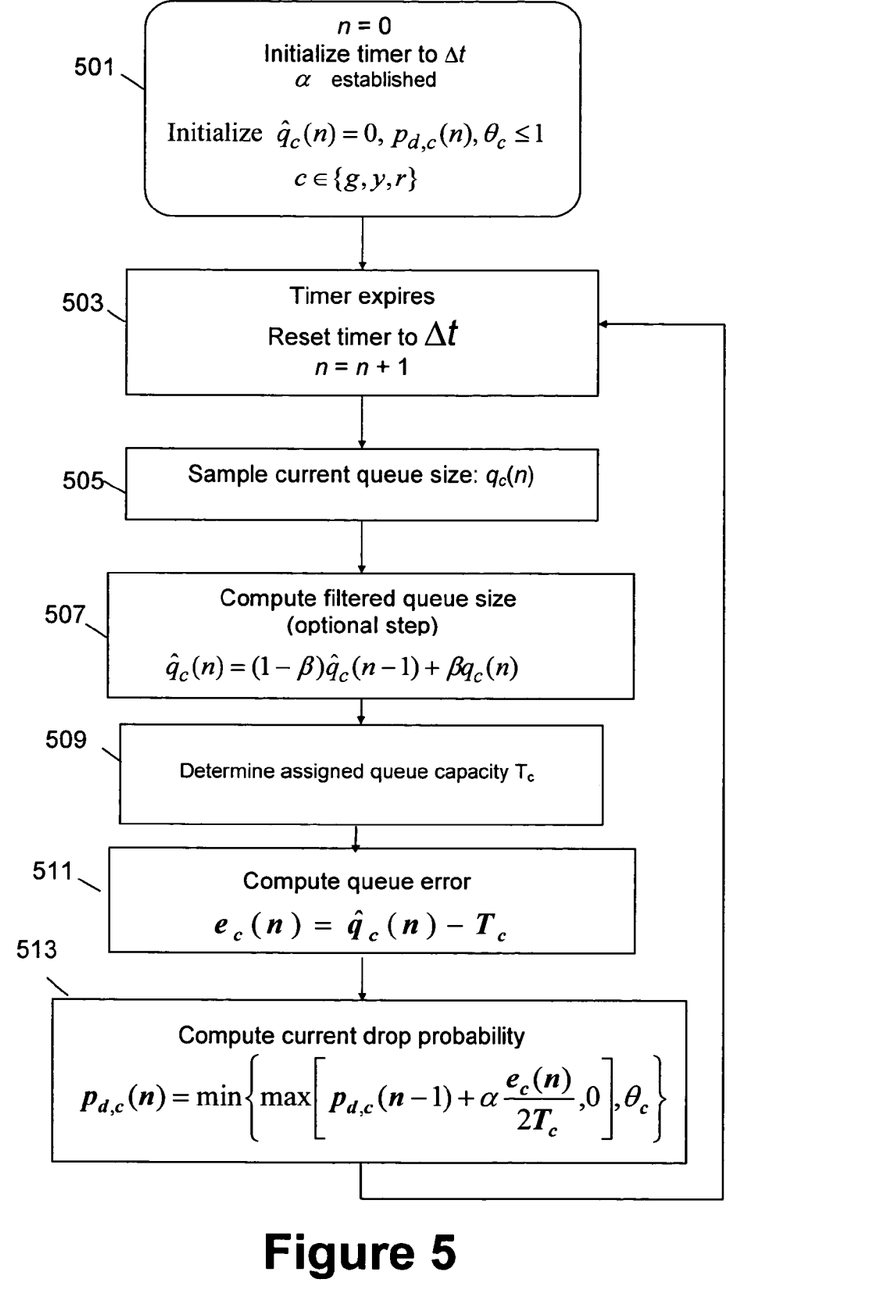
FIG. 5 is a block diagram of a mark/drop probability computation routine according to an alternative embodiment of the invention.

The drop probabilities are computed as shown in FIG. 5. As shown in FIG. 5 the process initiates, at step 501, at discrete time n=0, by initializing certain parameters. A timer is set to $\Delta t$ time units, a control gain $\alpha$ is established, and mark/drop probability $p_d(n)$, and initial queue size $\hat{q}(n)$ are set to initial values for each precedence grade. The initial mark/drop probability is used in the mark/drop routine until further samples are available. At step 503, the timer is reset to $\Delta t$ time units to advance to the next discrete time interval. Then at step 505, the current queue size $q_c(n)$ is measured for each precedence grade.

At step 507, there is an optional step of pre-filtering the queue as described previously.

At step 509, the assigned capacity for each precedence grade is determined. Typically, this is a given for a particular network configuration, possibly in an initialization step, but may vary as circumstances warrant, for example, if the network is modified.

At step 511, an error signal e(n) is calculated as the difference between the assigned queue capacity and the measured (and possibly filtered) cumulative queue size for each precedence grade.

At step 513, a current mark/drop probability $p_{d,c}(n)$ is calculated using the gain $\alpha$ established at step 501, again a separate probability calculated for each grade.

The mark/drop probability calculated at step 513 may be used as the mark/drop probability until the next measurement time as tracked by the timer, at which point a new mark/drop probability will be calculated. In addition, the filtered queue size $\hat{q}(n)$, if filtering is used, is stored to be used at the next measurement time.

The process may then loop back to step 503 upon timer expiration for another iteration of the process.

Figure 6:
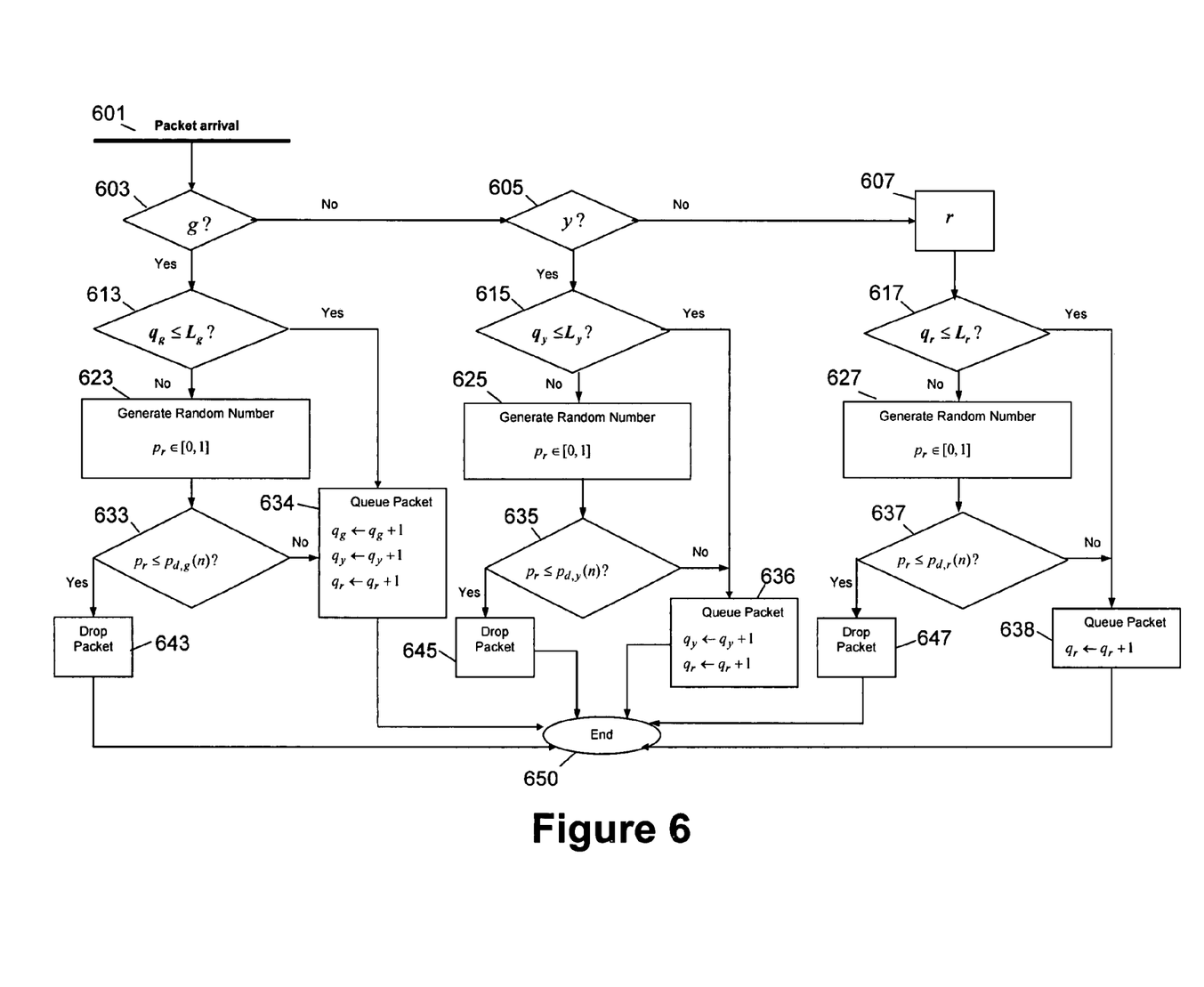
FIG. 6 is a block diagram of a packet mark/drop routine according to an alternative embodiment of the invention.

A packet drop routine for packets arriving at a queue running an embodiment of the invention is shown in FIG. 6. In general, given that under sustained traffic (with all colors), there is $q_g < q_y < q_r$, and given that $T_g = T_y = T_r$, red packets will get dropped the most and green packets will get dropped the least. Green packets are dropped only under severe congestion.

Referring to FIG. 6, the routine commences with a packet arrival at step 601. Steps 603, 605, and 607 effect a determination as to the color (precedence grade) associated with the packet. Steps 613, 615, and 617 each compare the respective queue size to a limit parameter to examine if the appropriate queue is less than the limit. If the queue is less than the limit, control moves to steps 634, 636, and 638 respectively for the packet to be queued, and in order to increment the appropriate queue size. Note how queuing a packet will impact the queue size of the queue of its color and all colors of lesser precedence.

Should the comparison in steps 613, 615, and 617 have determined that the respective queue size is in excess of the limit, a random number is generated at steps 623, 625, and 627 respectively. This random number is compared with the previously determined mark/drop probability $p_{d,c}(n)$ at steps 633, 635 and 637 respectively. Should the calculated probability $p_r$ be less than the previously determined mark/drop probability $p_{d,c}(n)$, then the packet is dropped at one of steps 643, 645, and 647 respectively. Should the comparison prove otherwise, then the packet is queued, and the appropriate queue size is incremented at steps 634, 636, and 638 as described previously. Upon the completion of either dropping the packet, or queuing the packet and incrementing the queue sizes, the routine ceases at step 650 until a new packet arrives.

Figure 7:
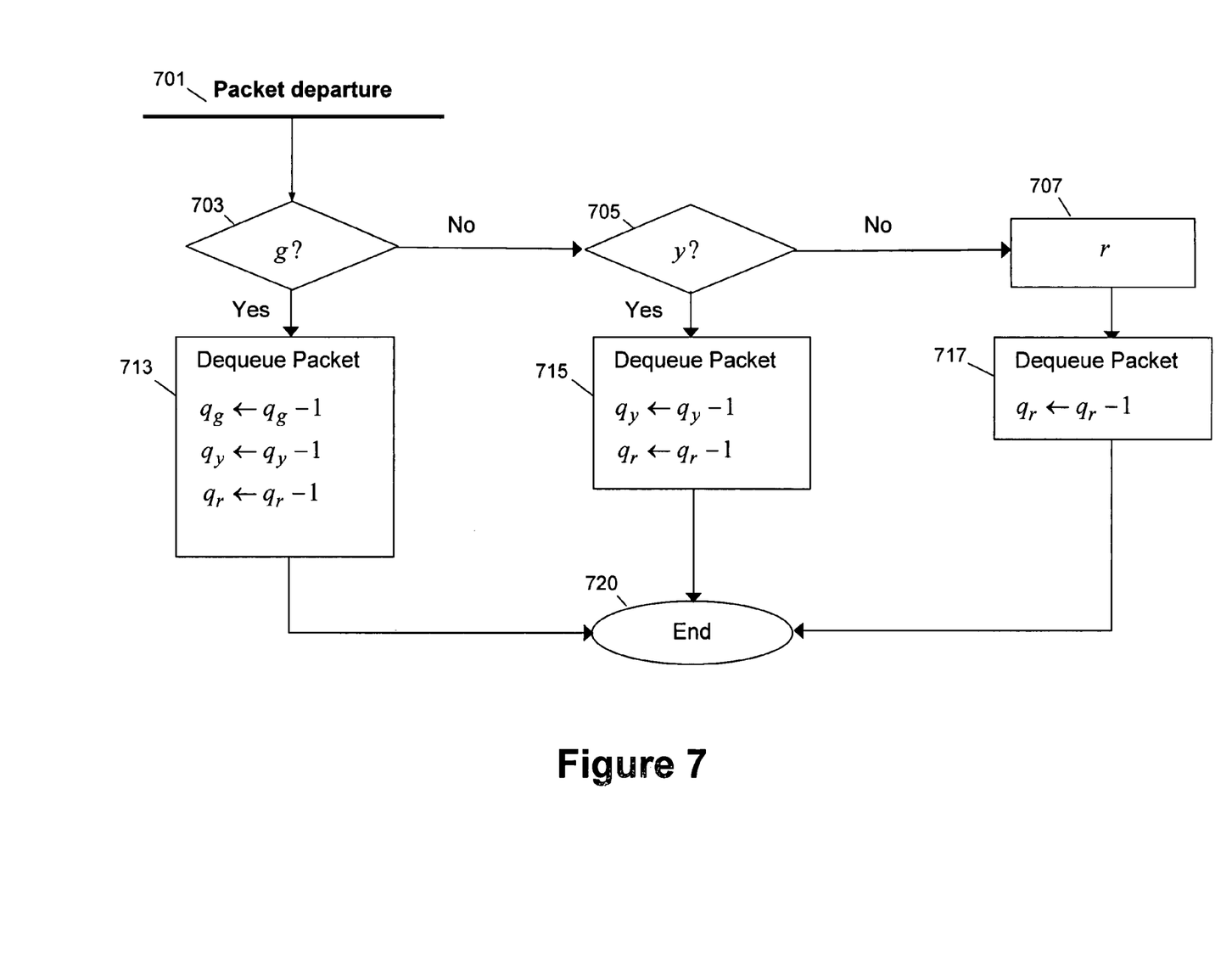
FIG. 7 is a block diagram of a packet dequeuing routine according to an alternative embodiment of the invention.

FIG. 7 shows how the queue size counters are updated when a packet of a particular color leaves the queue. Referring to FIG. 7, the routine commences with a packet departure at step 701. Steps 703, 705, and 707 effect a determination as to the color (precedence grade) associated with the packet. Appropriate to the color (precedence grade), steps 713, 715, and 717 dequeue the packet, and decrement the appropriate queue size for the color associated with the packet. Note how a dequeuing a packet will impact the queue size of the queue of its color and all colors of smaller precedence. Upon completion of dequeuing and queue size decrementing, the routine ends at step 720 until the departure of another packet.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for controlling a data flow in a data network at an element having a queue, the method comprising:
   specifying a plurality of precedence grades, each of said precedence grades having a priority associated thereto;
   for each precedence grade, calculating a cumulative queue size q(n) where q(n) is the sum of the queue size for a particular precedence grade under consideration plus the queue sizes of all precedence grades with a higher priority than said particular precedence grade under consideration;
   for each precedence grade calculating an error signal e(n), according to the relation $e(n)=(q(n)-T)$, where T is an-assigned precedence grade queue capacity at time n;
   for each precedence grade computing a mark/drop probability p(n) according to the relation $p(n)=\min\{\max\ [p(n-1)+\alpha \cdot e(n)/2 \cdot T,\ 0],\ \theta\}$ where α is a control gain, and 0<θ≦1; and
   for each precedence grade executing a packet mark/drop routine based upon the calculated mark/drop probability p(n).

2. The method of claim 1 wherein the number of precedence grades is three.

3. The method of claim 1 wherein the step of for each precedence grade measuring a queue size q(n) at time n further comprises:
   filtering the queue size q(n) according to the relation:

$q'(n)=(1-\beta)\cdot q'(n-1)+\beta \cdot q(n)$ where β is a filter gain parameter such that 0<β<1,
   q'(n−1) is the filtered queue size at time n−1,
   q'(n) is the desired filtered queue size at time n, and
   q(n) is the cumulative queue size at time n.

4. The method of claim 1 further comprising a step, preceding the step of for each precedence grade executing a packet mark/drop routine, of:
   for each precedence grade testing the cumulative queue size q(n) against a queue threshold L specific to that precedence grade; and
   if the cumulative queue size q(n) is below or equal to said queue threshold L then bypassing the step of executing a packet mark/drop routine for that precedence grade.

5. The method of claim 1 further comprising a step, preceding the step of for each precedence grade executing a packet mark/drop routine, of:
   for each precedence grade testing the cumulative queue size q(n) against a queue threshold L common to all precedence grades; and
   if the cumulative queue size q(n) is below or equal to said queue threshold L then bypassing the step of executing a packet mark/drop routine for that precedence grade.

6. The method of claim 1 wherein the step of executing a packet mark/drop routine further comprises marking/dropping packets according to a random number generator mark/drop scheme.

7. An apparatus for controlling a data flow in a data network having a plurality of precedence grades each of said precedence grades having a priority associated thereto, the apparatus comprising:
   a cumulative queue size calculator for calculating a cumulative queue size q(n) associated with each of said plurality of precedence grades, wherein q(n) is the sum of the queue sizes for a particular precedence grade under consideration plus the queue sizes of all precedence grades with a higher priority than said particular precedence grade under consideration;
   an error signal calculator for calculating a error signal e(n) for each of said plurality of precedence grades according to the relation $e(n)=(q(n)-T)$, where T is an assigned precedence grade capacity at time n;
   a mark/drop probability processor for computing a mark/drop probability p(n) for each of said plurality of precedence grades according to the relation $p(n)=\min\{\max\ [p(n-1)+\alpha \cdot e(n)/2 \cdot T,\ 0],\ \theta\}$ where α is a control gain, and 0<θ≦1; and
   a packet mark/drop module for executing a packet mark/drop routine based upon the calculated mark/drop probability p(n).

8. The apparatus of claim 7 wherein the number of precedence grades is three.

9. The apparatus of claim 7 wherein the queue size calculator for calculating queue size q(n) at time n further comprises:
   a filter for filtering the queue size q(n) according to the relation:

$q'(n)=(1-\beta)\cdot q'(n-1)+\beta \cdot q(n)$ where β is a filter gain parameter such that 0<β<1,
   q'(n−1) is the filtered data arrival rate at time n−1,
   q'(n) is the desired filtered data arrival rate at time n, and
   q(n) is the cumulative data arrival rate at time n.

10. The apparatus of claim 7 further comprising:
    a test module for testing the cumulative queue size q(n) against a queue threshold L specific to that precedence grade; configured such that
    if the cumulative queue size q(n) is below or equal to said queue threshold L then bypassing the packet mark/drop module for that precedence grade.

11. The apparatus of claim 7 further comprising:
    a test module for testing the cumulative queue size q(n) against a threshold L common to all precedence grades; configured such that
    if the cumulative queue size q(n) is below or equal to said threshold L then bypassing the packet mark/drop module for that precedence grade.

12. The apparatus of claim 7 wherein the packet mark/drop module further comprises a random number generator drop scheme module.

13. A computer program product comprising a computer readable medium having stored thereon computer executable instructions for controlling a data flow in a data network, the computer executable instructions comprising:

instructions for specifying a plurality of precedence grades, each of said precedence grades having a priority associated thereto;

instructions for calculating, for each precedence grade, a cumulative queue size q(n) where q(n) is the sum of the data arrival rates for a particular precedence grade under consideration and the data arrival rates of all precedence grades with a higher priority than said particular precedence grade under consideration;

instructions for calculating, for each precedence grade, an error signal e(n), according to the relation $$e(n) = (q(n) - T),$$

where T is an assigned precedence grade capacity at time n;

instructions for computing, for each precedence grade, a mark/drop probability p(n) according to the relation $$p(n) = \min\{\max\,[p(n-1) + \alpha \cdot e(n)/2 \cdot T,\, 0],\, \theta\}$$

where $\alpha$ is a control gain, and $0 < \theta \leq 1$; and instructions for executing, for each precedence grade, a packet mark/drop routine based upon the calculated mark/drop probability p(n).

* * * * *